US007170394B2

(12) United States Patent
Chandler et al.

(10) Patent No.: US 7,170,394 B2
(45) Date of Patent: Jan. 30, 2007

(54) REMOTE CURRENT SENSING AND COMMUNICATION OVER SINGLE PAIR OF POWER FEED WIRES

(75) Inventors: Kevin G. Chandler, Loveland, CO (US); Antonio Carlos Monte-Filho, Fort Collins, CO (US)

(73) Assignee: Agilent Technologies, Inc., Santa Clara, CA (US)

( * ) Notice: Subject to any disclaimer, the term of this patent is extended or adjusted under 35 U.S.C. 154(b) by 732 days.

(21) Appl. No.: 10/632,463

(22) Filed: Jul. 31, 2003

(65) Prior Publication Data

US 2005/0024066 A1 Feb. 3, 2005

(51) Int. Cl.
*G05B 11/01* (2006.01)

(52) U.S. Cl. ........................... 340/310.11; 340/310.12; 340/310.16; 340/538; 340/538.11; 340/538.15

(58) Field of Classification Search .................... None
See application file for complete search history.

(56) References Cited

U.S. PATENT DOCUMENTS 4,151,585 A * 4/1979 Bowles ........................ 363/35
4,663,499 A * 5/1987 Duval ........................ 178/2 R
4,746,897 A * 5/1988 Shuey ........................ 375/219
4,999,607 A * 3/1991 Evans ........................ 340/533
5,117,219 A * 5/1992 Tice et al. .................. 340/518
5,254,953 A 10/1993 Crook et al.
5,274,336 A 12/1993 Crook et al.
5,381,417 A 1/1995 Loopik et al.
5,498,964 A 3/1996 Kerschner et al.
5,557,209 A 9/1996 Crook et al.
5,652,755 A * 7/1997 Carey ........................ 714/811
5,696,451 A 12/1997 Keirn et al.
5,974,553 A * 10/1999 Gandar ...................... 713/300
6,369,699 B1 * 4/2002 Liu ....................... 340/538.11
6,987,444 B1 * 1/2006 Bub et al. ............. 340/310.11

* cited by examiner

*Primary Examiner*—Benjamin C. Lee
*Assistant Examiner*—Son Tang

(57) ABSTRACT

Disclosed is a novel technique for transferring power and signals between two electrical devices over a single wire pair. In particular, a remote sensor is connected to a host device. Power to the remote sensor is supplied through a voltage reference and control loop circuit that holds the voltage component of the power signal present on the wire pair constant during remote current sensing. The remote sensor itself can transmit measurements or information by driving a load on the sensor and thereby modulating the loop current. The current signal in the sensor-to-host loop can be a precision AC analog signal or a serial digital bit stream. Both types of signals can coexist using a multiplexing scheme.

31 Claims, 8 Drawing Sheets

REMOTE CURRENT SENSING AND COMMUNICATION OVER SINGLE PAIR OF POWER FEED WIRES

BACKGROUND OF THE INVENTION

There are many electronic systems that include a host device that powers one or more remote electrical devices. For various reasons, the physical connection between the host and remote devices is often limited to a single wire pair, or power feed lines. In these types of devices, it is often useful or necessary to pass signals between the host and remote device in one or both directions. One method for achieving this without increasing the number of wires between the devices is to modulate a signal of interest with the power signal present on the power feed lines.

FIG. 1 is a schematic of a system 2 illustrating a typical prior art method for passing a signal from a remote device to its host device over a pair of power feed lines. As illustrated in FIG. 1, a host device 4 supplies power over a pair of power feed wires 5*a* and 5*b*. A remote device 3 is serially connected between the positive and negative power feeds 5*a* and 5*b* to complete the current loop. The power feeds 5*a*, 5*b* provide a potential $V_{S1}$ across the remote device 3. A series impedance R6 is connected on the host 4 between the supply voltage $V_{SUPPLY}$ and the positive power feed line 5*a*. The negative (or ground) power feed line 5*b* is connected to the host circuit ground. In operation, the remote device 3 transmits the signal of interest by varying the current drawn in the power feed lines 5*a*, 5*b*. To recover the signal of interest, the host device 4 includes a differential amplifier 7, which measures the differential voltage 8 $V_{OUT}$ across the series impedance R 6. The current signal of interest is thus converted to a voltage signal and further processed by filter circuit 9.

The signal communication technique illustrated in FIG. 1 is problematic for several reasons. First, series impedance R 6 in the supply line 5*a* causes variation in the supply voltage of the remotely powered device. As with all circuits, the remote circuit 3 has limited power supply rejection. Supply voltage variations at the remote device 3 lead to degradation of the signal of interest (e.g., a measurement signal) or, in some cases, instability and oscillation.

Second, the value of the series impedance R 6 must be relatively low in order to minimize the voltage drop across the impedance R 6. Therefore, current-to-voltage gain adjustments are limited and overall measurement dynamic range is degraded.

Finally, a relatively complex differential amplifier 7 with high common mode rejection and matched components is required in order to sense the voltage across the series impedance R 6. Often this differential amplifier is AC-coupled which adds additional cost and complexity.

Accordingly, a need exists for a simpler, more robust technique for sensing remote current signals over a single pair of power feed wires.

SUMMARY OF THE INVENTION

The present invention is a novel remote current sensing technique that utilizes only the wire pair supplying power to the remote device. The invention finds particular application in a host-to-remote sensor configuration wherein the host supplies power to the remote device and analog and/or digital signals are channeled between the host and remote device in one or both directions over a single pair of wires.

In accordance with the invention, a host device is connected to a remote device via a single wire pair. The host device sources a power signal over the wire pair to power the remote device. The host device utilizes a voltage reference and control loop circuit which enforces a substantially constant voltage component of the power signal present on the wire pair during current-modulated communication in either or both directions between the host device and remote device.

For example, in one embodiment the remote device generates a remote signal. To channel the remote signal to the host device, the remote device modulates the current component of the power signal present on the wire pair with the remote signal. During current modulation, the voltage reference circuit and amplifier on the host maintain a substantially constant voltage component (i.e., a pre-determined voltage level within a narrow margin of error) of the power signal present on the wire pair. Simultaneously, the host device recovers the current signal by converting it to a varying voltage at the output of the amplifier (Vout).

In another embodiment the host device generates a host signal. To channel the host signal to the remote device, the voltage reference circuit enforces a substantially constant voltage component of the power signal present on the wire pair, while the host device modulates the current component of the power signal present on the wire pair with the host signal. Simultaneously, the remote device de-modulates the current component of the power signal to recover the host signal.

The invention finds particular application in a unique electronic circuit which provides power and multiplexes host signals and remote device signals over a single pair of wires. In accordance with one preferred embodiment of the invention, the invention is used to supply power, and sequentially channel analog measurement signals and digital communication signals between electronic devices over a single pair of wires. In this embodiment, a host device is electrically connected to a remote device via two wires. The host device supplies power to the remote device over the two wires. Analog measurement and/or digital control/data signals may be sent from the remote device to the host device. To this end, the remote device generates an analog signal of interest. While the host device enforces a constant supply voltage at the remote device, the remote device transmits the analog signal of interest by modulating the current component of the power signal present on the wire pair. The host device extracts the modulated current component of the power signal present on the wire pair to recover the analog signal of interest. The demodulation or "extraction" process consists of an amplifier-based current-to-voltage conversion followed by a bandpass filter to select the frequencies of interest. The topology of the illustrative embodiment allows the loop current to vary without significantly disturbing the supply voltage at the remote device.

Communication signals may be exchanged between the host and remote devices. In a uni-directional communication scheme, whereby the host device sends digital control/data signals to the remote device, the host device either voltage- or current-modulates either the voltage component or the current component of the power signal present on the wire pair with the digital signal of interest. The remote device may then demodulate the respective voltage- or current-modulated component of the power signal present on the wire pair to recover the digital signal of interest. In an alternative uni-directional communication scheme, whereby the remote device sends digital control/data signals to the host device, the host device enforces a constant supply voltage across the remote device while the remote device current-modulates the digital signal of interest with the current component of the power signal present on the wire pair. The host device may then demodulate the current-modulated component of the power signal present on the wire pair to recover the digital signal of interest.

In a bi-directional communication scheme, for communication from the host to the remote device, the host device may voltage-modulate the voltage signal present on the wire pair to indicate communication from the host to the remote device. The remote device de-modulates the host signal from the voltage component of the power signal present on the wire pair. For communication from the remote to the host device, the remote device may current-modulate the current component of the power signal present on the wire pair while the host device enforces a constant supply voltage across the remote device. The host device de-modulates the remote signal from the current component of the power signal present on the wire pair.

The described wire power, signal, and communication transfer technique may be used, for example, in a system having a measurement probe which senses analog signals that are transmitted to a host instrument for conversion into measurements of interest and further processing. Example measurements would include (but not limited to) capacitance, temperature, humidity, proximity, and the like. The measurement probe and test instrument may be connected by only two wires over which power, analog measurement signals, and bi-directional communication signals are transferred. Illustrative examples of digital signal exchange would include querying of probe type, reporting of status, uploading probe calibration constants, start and stop measurement handshaking, and other similar functions.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION

A novel remote current sensing technique and application is described in detail hereinafter. Although the invention is described in terms of specific illustrative embodiments, it is to be understood that the embodiments described herein are by way of example only and that the scope of the invention is not intended to be limited thereby.

1. General Embodiment

Figure 1:
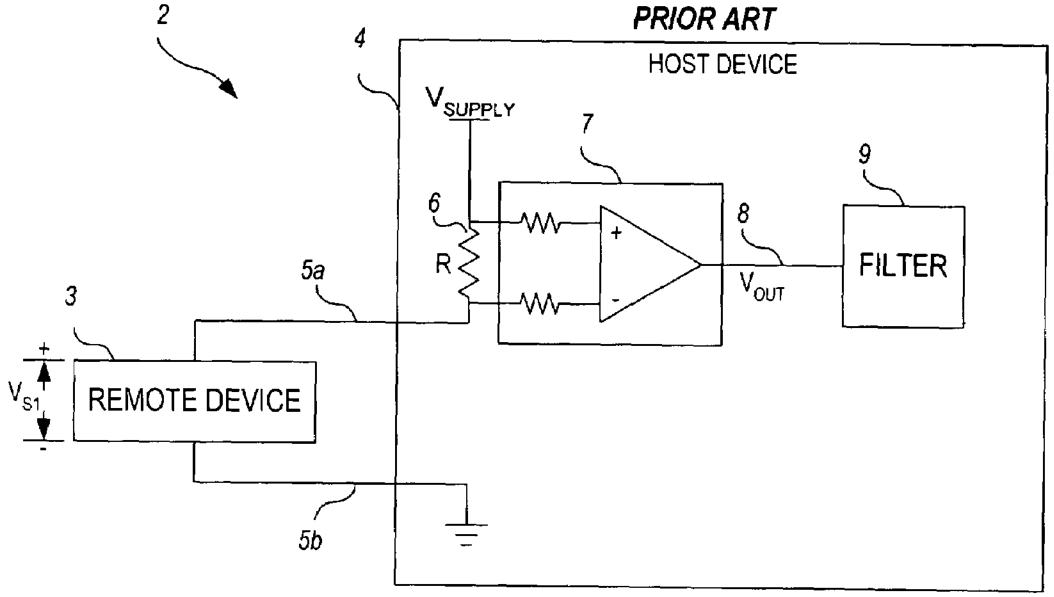
FIG. 1 is a high-level schematic diagram of a prior art remote signal sensing apparatus.
Figure 2A:
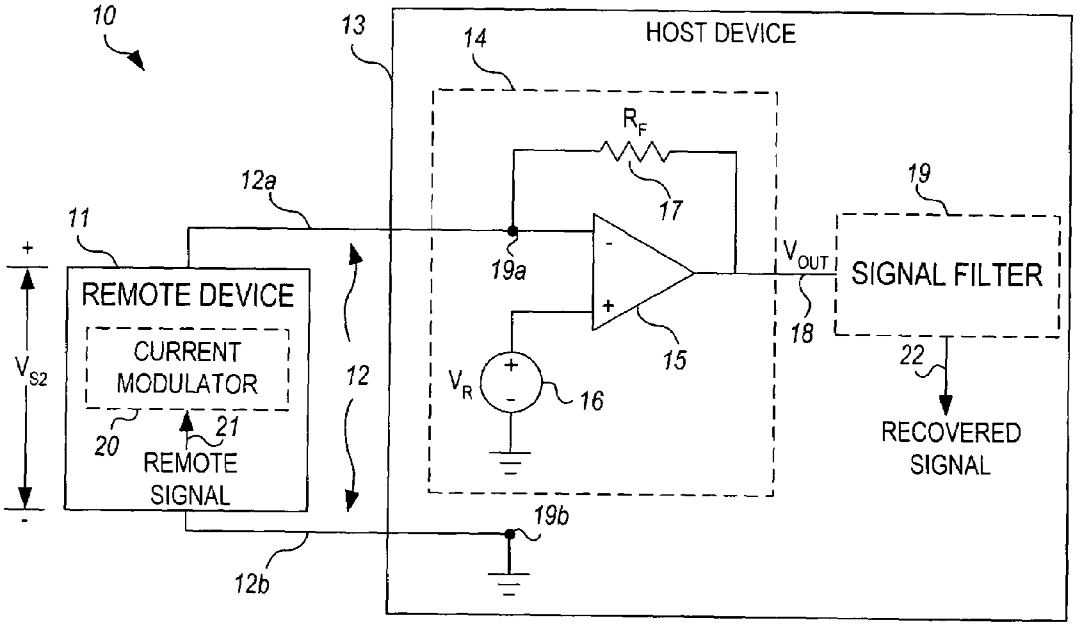
FIG. 2A is a high-level schematic diagram of a first embodiment of a system implementing the remote current sensing technique of the invention.

Turning now in detail to the drawings, FIG. 2A is a high-level schematic diagram of a system 10 implementing the remote current sensing technique of the invention. As illustrated, system 10 includes a remote device 11 connected to a host device 13 via a single wire pair 12 comprising a first wire 12*a* and a second wire 12*b*. Host device 13 includes a voltage reference circuit 14 which generates a substantially constant first voltage source 19*a* on the first wire 12*a* and a substantially constant second voltage source 19*b* on the second wire 12*b*. The phrase "substantially constant" means herein that the voltage potential across the wire pair that is supplied to the remote device remains essentially fixed subject to a small margin of error. In the preferred embodiment, the voltage reference circuit 14 is implemented with an operational amplifier circuit including a standard operational amplifier 15 with feedback resistor $R_F$ 17 connected between the output 18 of the operational amplifier 15 and the inverting input terminal of the operational amplifier 15, and a voltage source 16 which sources a reference voltage $V_R$ connected to the non-inverting input terminal of the operational amplifier 15. As known in the art, by design a standard operational amplifier maintains a zero potential, or "virtual null", between its non-inverting and inverting input terminals. To maintain a "virtual null" between its non-inverting and inverting input terminals, operational amplifier 15 adjusts its output voltage $V_{OUT}$ such that the voltage drop across feedback resistor $R_F$ 17 forces the voltage on the inverting input terminal of the operational amplifier 15 to reflect the voltage at the non-inverting input terminal of the operational amplifier 15.

In the illustrative embodiment, the first voltage source 19*a* is connected to the inverting input terminal of the operational amplifier 15, and the second voltage source 19*b* is connected to the host circuit ground. Accordingly, because the control operational amplifier 15 drives the summing node 19*a* in FIG. 2*a* to voltage $V_R$ even as the current in the loop varies, the supply voltage $V_{S2}$ across the remote device 11 mirrors the reference voltage $V_R$ (i.e., $V_{S2}=V_R$) and remains fixed (assuming the that the series resistance of the connection wire 12*a* is negligible and that the value of $V_R$ is chosen such that the host circuit supply voltage $V_{SUPPLY}$ to the operational amplifier 15 is greater than $V_R$ and $V_R$ is large enough to drive at least the quiescent current of the remote device 11 plus the maximum modulated current plus margin).

The ability to enforce a substantially constant supply voltage $V_{S2}$ across the remote device 11 enables the ability to pass precision AC or digital signals between the remote device 11 and host device 13 in one or both directions. Specifically, because the supply voltage $V_{S2}$ of the remote device 11 remains fixed, precision AC or digital signals generated on one device can be sent to the other device by modulating the current component of the power signal on the sending device and de-modulating the current component of the power signal on the receiving device. For example, in FIG. 2A, the remote device 11 may generate a signal 21 which needs to be received and processed by the host device 13. To allow this, the remote device 11 may be configured with a current modulator 20 that varies the loop current on the wire pair 12*a*, 12*b* in a way which is proportional to remote measurement signal 21. As shown in our example embodiment, the said "current modulator" can be implemented with a simple analog amplifier or digital buffer that drives a resistive load connected to the power or ground node. The variation in current through said resistive load will be precisely reflected in the total supply current drawn by the remote sensor.

The host device 13 is likewise configured with a current de-modulator 19 that de-modulates the current component of the power signal present on the wire pair 12*a*, 12*b* to generate a recovered remote signal 22. In the illustrative embodiment, the current demodulator in the host device 13 monitors the AC current in the loop at the output 18 of the operational amplifier 15. In particular, because the supply voltage $V_{S2}$ of the remote device 11 remains fixed at $V_R$, AC current modulation will show up as a signal variation on $V_{OUT}$ at the output 18 of the operational amplifier 15 as the modulated current in the power signal on wires 12*a*, 12*b* causes the operational amplifier 15 to adjust the voltage $V_{OUT}$ on its output 18 in order to maintain the virtual null between its inverting and non-inverting input terminals. In the examples shown herein, Vout will be inversely proportional to the loop current since the host amplifier is configured in the inverting mode. In any case, the signal at $V_{OUT}$ may be processed to recover the remote signal. An additional signal inversion step may be added during filtering and processing if desired.

Figure 2B:
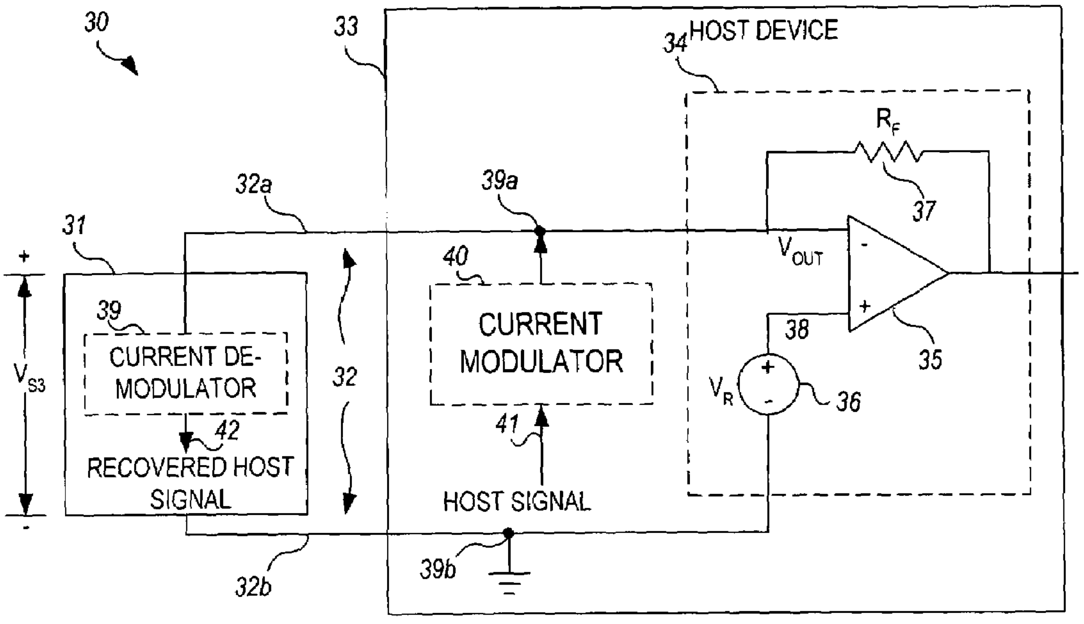
FIG. 2B is a high-level schematic diagram of a second embodiment of a system implementing the remote current sensing technique of the invention.

FIG. 2B is a high-level schematic diagram of an alternative embodiment of a system 30 implementing the remote current sensing technique of the invention. In this system 30, a remote device 31 is connected to a host device 33 via a single wire pair 32 (comprising a first wire 32*a* and a second wire 32*b*). Host device 33 includes a voltage reference circuit 34 which generates a substantially constant first voltage source 39*a* on the first wire 32*a* and a substantially constant second voltage source 39*b* on the second wire 32*b*. Again, the voltage reference circuit 34 is preferably implemented with a standard operational amplifier 35 having a feedback resistor $R_F$ 37 connected between the output 38 and the non-inverting input terminal of the operational amplifier 35, and a voltage source 36 which sources a reference voltage $V_R$ connected to the inverting input terminal of the operational amplifier 35. The "virtual null" between the non-inverting and inverting input terminals of the operational amplifier 35 forces the voltage seen at the non-inverting input terminal of the operational amplifier 35 to reflect the voltage reference $V_R$. The first voltage source 39*a* is taken at the node connected to the non-inverting input terminal of the operational amplifier 35, and the second voltage source 39*b* is connected to the host circuit ground. Accordingly, the supply voltage $V_{S3}$ across the remote device 31 mirrors the reference voltage $V_R$ (i.e., $V_{S3}$=VR).

In the embodiment of FIG. 2B, the host device 33 may generate a host signal 41 which needs to be communicated to the remote device 31. To allow this, the host device 33 may be configured with a current modulator 40 that modulates the current component of the power signal present on the wire pair 32*a*, 32*b* with the host signal 41. The remote device 31 is likewise configured with a current de-modulator 39 that de-modulates the current component of the power signal present on the wire pair 32*a*, 32*b* to generate a recovered host signal 42.

Figure 3A:
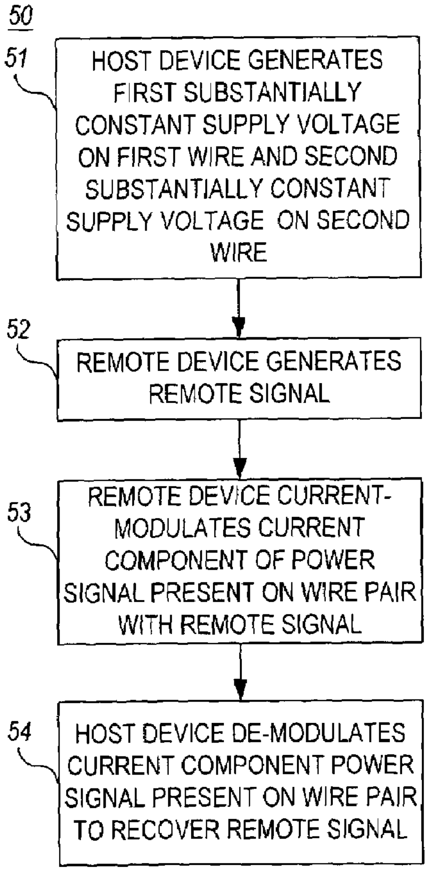
FIG. 3A is an operational flowchart illustrating a first embodiment of a method that utilizes the remote current sensing technique of the invention.

FIG. 3A illustrates a first method 50 that utilizes the techniques of the invention. As illustrated, the method 50 begins with a step 51 where the host device generates and supplies a first substantially constant supply voltage on a first wire of a wire pair connected to a remote device and a second substantially constant supply voltage on a second wire of the wire pair connected to the remote device. In a step 52, the remote device generates a remote signal, and in a step 53 the remote device current-modulates the current component of the power signal present on the wire pair with the remote signal. Finally, in a step 54, the host device de-modulates the current component of the power signal present on the wire pair to recover the remote signal.

Figure 3B:
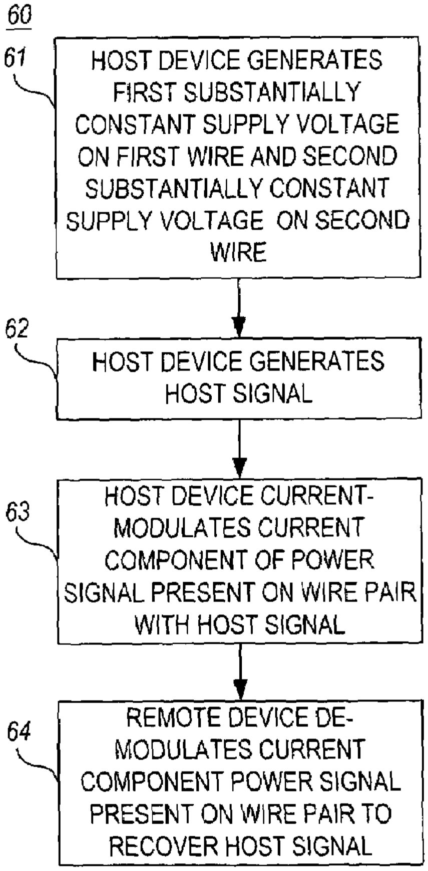
FIG. 3B is an operational flowchart illustrating a second embodiment of a method that utilizes the remote current sensing technique of the invention.

FIG. 3B illustrates a second method 60 that utilizes the techniques of the invention. As illustrated, the method 60 begins with a step 61 where the host device generates and supplies a first substantially constant supply voltage on a first wire of a wire pair connected to a remote device and a second substantially constant supply voltage on a second wire of the wire pair connected to the remote device. In a step 62, the host device generates a host signal and in step 63 the host device current-modulates the current component of the power signal present on the wire pair with the host signal. Finally, in a step 64, the remote device de-modulates the current component of the power signal present on the wire pair to recover the host signal.

2. First General Application

Figure 4A:
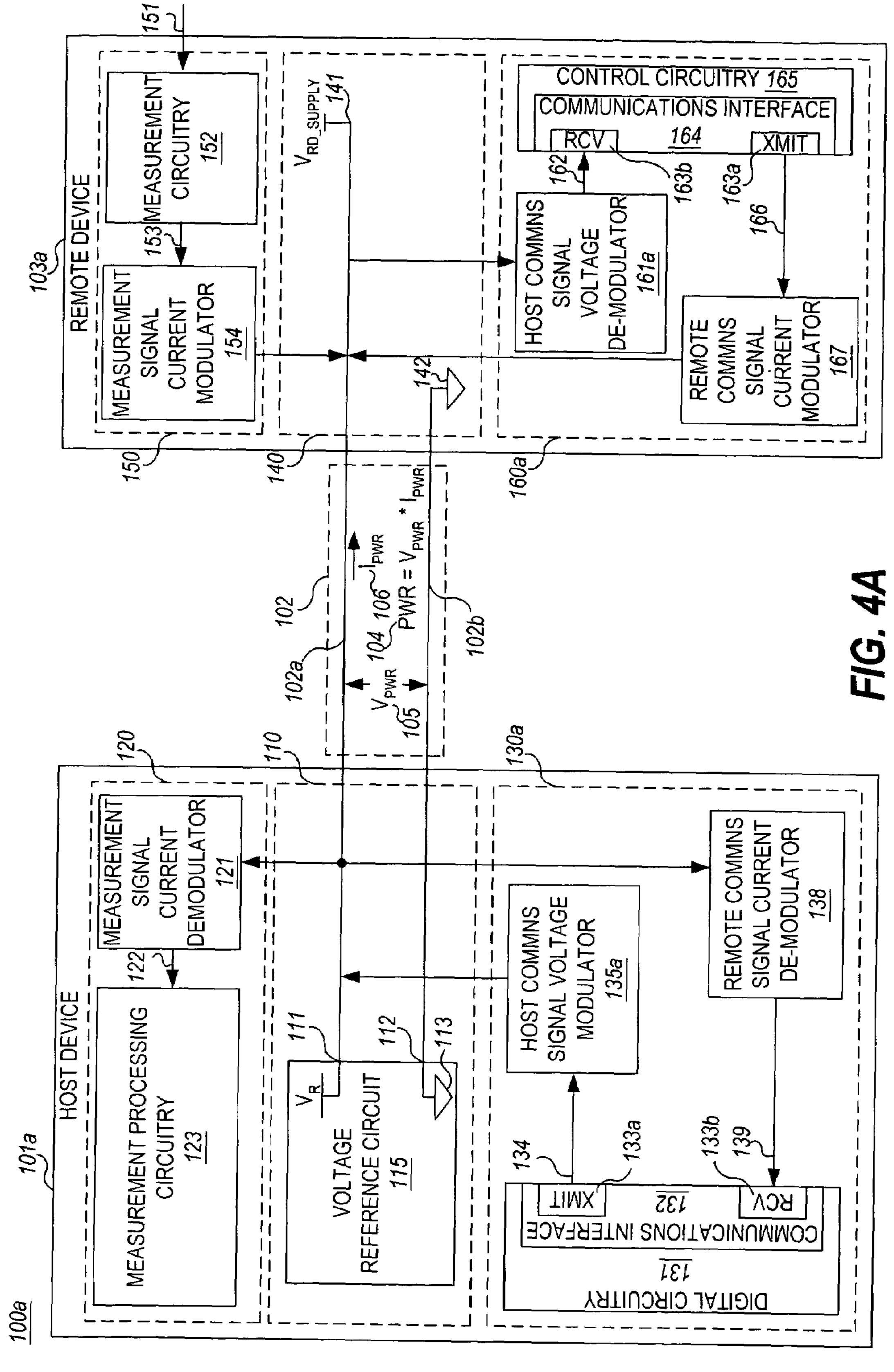
FIG. 4A is a schematic block diagram of a system illustrating a first exemplary application of the present invention.

FIG. 4A illustrates a first embodiment of an exemplary application of the present invention. In particular, FIG. 4A is a schematic diagram illustrating a system 100*a* with a remote sensor device 103*a* connected to a host device 101*a* via a single wire pair 102 (including wires 102*a* and 102*b*). The invention uniquely allows the channeling of power from the host device 101*a* to the remote sensor device 103*a*, transmission of measurement signals from the remote sensor device 103*a* to the host device 101*a*, and bi-directional communication between the host device 101*a* and remote sensor device 103*a* over the single wire pair 102.

a. Power Capability

Host device 101*a* includes power block 110 comprising a voltage reference and control loop circuit 115 which enforces a substantially constant voltage component of the power signal present on the wire pair during current-modulated communication in either or both directions between the host device and remote device. In particular, the voltage reference and control loop circuit 115 generates a substantially constant first voltage source 111 on the first wire 102*a* and a substantially constant second voltage source 112 on the second wire 102*b*. The phrase "substantially constant" means herein that the voltage level remains at a constant level (allowing for a narrow margin of error) or changes only marginally over a long period of time relative to the signal frequency due to drift. In the preferred embodiment, the voltage reference circuit 115 is implemented with an operational amplifier circuit such as that shown in FIG. 2A or 2B, wherein the first substantially constant voltage source 111 is connected to a reference voltage source $V_{REF}$ 114 and the second substantially constant voltage source 112 is connected to the host circuit ground 113.

Remote sensor device 103*a* also includes a power block 140. Power block 140 comprises first and second voltage source nodes 141 and 142. First and second voltage source nodes 141 and 142 must be connected to external voltage sources (such as first and second voltage sources 111 and 112 in host device 101*a*) in order to operate as voltage sources within the sensor device 103.

In accordance with the invention, the first wire 102*a* of wire pair 102 is electrically connected at a first end to the first voltage source 111 located within the host device 101*a* and at a second end to the first voltage source node 141 within the sensor device 103. The second wire 102*b* is electrically connected at a first end to the second voltage source 112 located within the host device 101*a* and at a second end to the second voltage source node 142 within the sensor device 103*a*. As described above, in the preferred embodiment, the first voltage source 111 is a substantially constant voltage source referenced to a reference voltage source $V_{REF}$ and the second voltage source 112 is connected to the host circuit ground 113. Accordingly, when connected in this manner, the potential across the wire pair 102 is $V_{REF}$. Also, in this described capacity, the single wire pair 102 supplies power PWR 104 with a voltage component $V_{PWR}$ 105 and a current component $I_{PWR}$ 106 to the remote sensor device 103*a*.

b. Measurement Capability

Remote sensor device 103*a* includes a measurement signal processing block 150, which includes measurement circuitry 152 and a current modulator 154. Measurement circuitry 152 senses or receives, and otherwise processes, a measurement 151 to generate a measurement signal 153 representative of the measurement 151. Example measurements include (but are not limited to) capacitance, temperature, humidity, proximity, and the like. The measurement circuitry 152 passes the measurement signal 153 to a measurement signal current modulator 154. Measurement signal current modulator 154 current-modulates the measurement signal 153 by adding a component representative of the measurement signal to the DC current in the power loop comprised of wires 102*a* and 102*b*.

Host device 101*a* includes a measurement signal processing block 120, which includes a measurement signal current de-modulator 121 and measurement processing circuitry 123. Measurement signal current de-modulator 121 receives the modulated current component $I_{PWR}$ 106 of the power signal PWR 104 present on the wire pair 102, de-modulates the measurement signal component from the modulated current component $I_{PWR}$ 106, and passes the de-modulated signal 122 to the measurement processing circuitry 123 for further processing and analysis. In this described capacity, the single wire pair 102 operates to channel measurements 151 from the remote sensor device 103*a* to the host device 101*a*.

c. Communications Capability

In the preferred embodiment, the system 100*a* allows bi-directional communication. Bi-directional communication is achieved as follows:

Remote sensor device 103*a* includes a communications block 160*a*, which includes remote control circuitry 165 and a communications interface 164 having a transmit circuit 163*a* and a receive circuit 163*b*. Communications block 160 also includes a remote communications signal current modulator 167 and a host communications signal voltage demodulator 161*a*.

Remote control circuitry 165 may include a processor, memory, sensors, and/or any other circuit components or devices that generate remote communications data. Communications interface 164 includes standard circuitry which may include functionality for encoding, formatting, and otherwise preparing the remote communications signal 166 generated by the remote control circuitry 165 for transmission to the host device 101*a*. The transmit circuit 163*a* outputs a remote communications signal 166 representative of the remote communications data. A remote communications signal current modulator 167 current-modulates the current component $I_{PWR}$ 106 of the power signal PWR 104 present on the wire pair 102 with the remote communications signal 166.

Host device 101*a* includes a communications block 130*a*, which includes host control circuitry 131, a communications interface 132 having a transmit circuit 133*a* and a receive circuit 133*b*. Communications block 130*a* also includes a remote communications signal current de-modulator 138 and a host communications signal voltage modulator 135*a*.

Figure 5A:
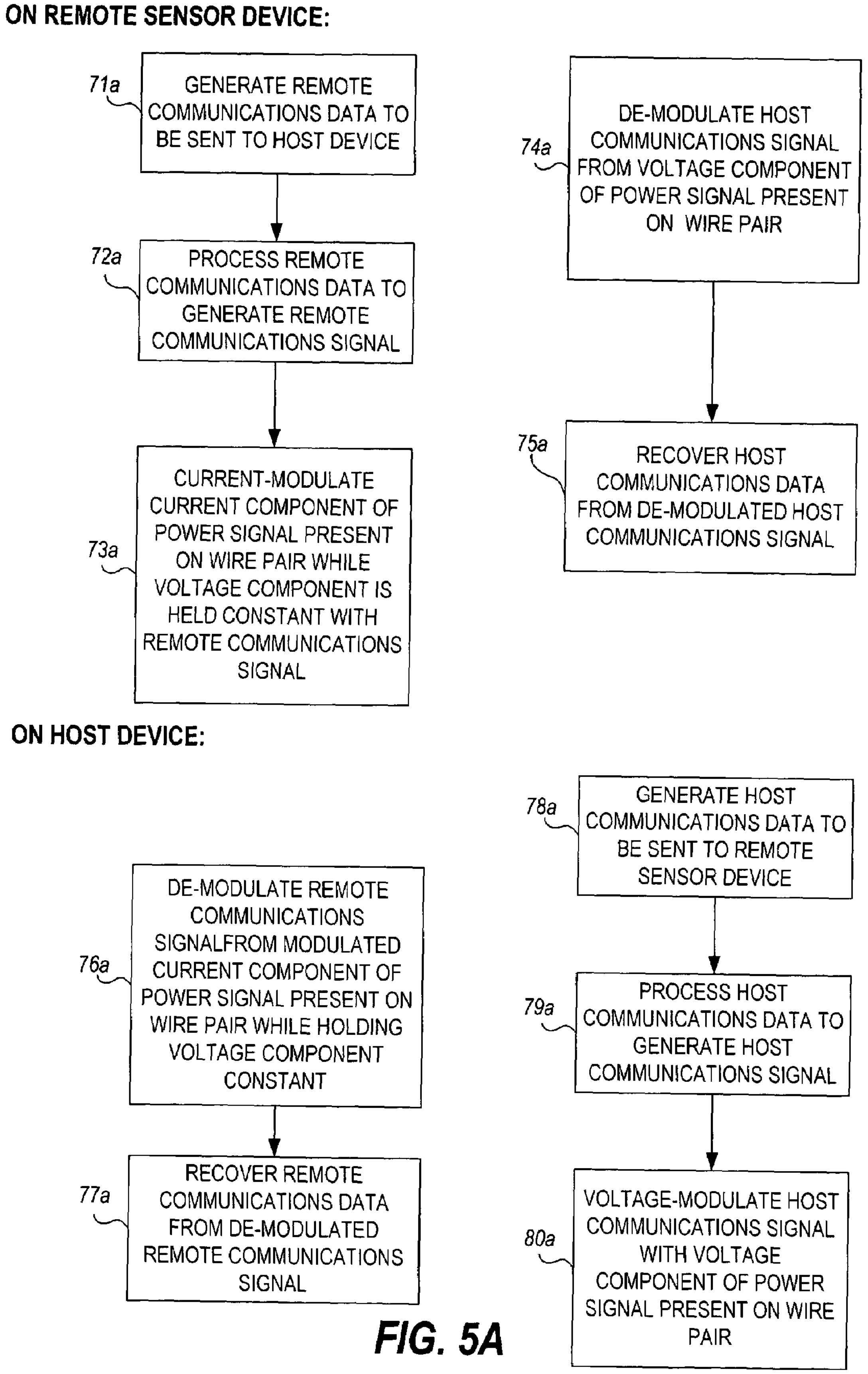
FIG. 5A is an operational flowchart illustrating the communication signal flow between the host and remote sensor devices of FIG. 4A.

FIG. 5A illustrates an exemplary method of operation of the system 100*a* of FIG. 4A. In operation, the remote sensor device 103*a* generates remote communications data to be sent to the host device 101*a* in step 71*a*. In step 72*a*, the remote sensor device 103*a* processes the remote communications data to generate a remote communications signal 166 representative of the remote communications data. In step 73*a*, the remote communications signal is used to modulate the current component $I_{PWR}$ 106 of the power signal PWR 104 present on the wire pair 102 while the voltage component $V_{PWR}$ 105 of the power signal PWR 104 is held substantially constant.

On the host side, the remote communications signal current de-modulator 138 demodulates the remote communications signal 139 from the current component $I_{PWR}$ 106 of the power signal PWR 104 in step 76*a* while the voltage component $V_{PWR}$ 105 of the power signal PWR 104 is held substantially constant. In step 77*a* the host device 101*a* recovers the remote communications data from the demodulated remote communications signal 139.

The host device 101*a* generates host communications data that needs to be sent to the sensor device 103*a* in step 78*a*. In step 79*a*, the host device 101*a* processes the host communications data to generate a host communications signal 134 representative of the host communications data. In step 80*a*, the host device 101*a* voltage modulates the voltage component $V_{PWR}$ 105 of the power signal PWR 104 present on the wire pair 102 with the host communications signal 134. The loop current need not be held constant during voltage modulation communication. When the host modulates voltage $V_R$ and thereby varies the voltage supplied to the remote device, the current in the loop may also vary without adversely affecting circuit performance. In voltage modulation mode the receiving device senses voltage variations even if loop current varies simultaneously.

On the side of the remote sensor device 103*a*, in step 74*a* the host communications signal voltage de-modulator 161*a* demodulates the host communications signal from the voltage component $V_{PWR}$ 105 of the power signal PWR 104 present on the wire pair 102. In step 75*a*, the remote sensor device 103*a* recovers the host communications data from the demodulated host communications signal 139.

2. Second General Application

Figure 4B:
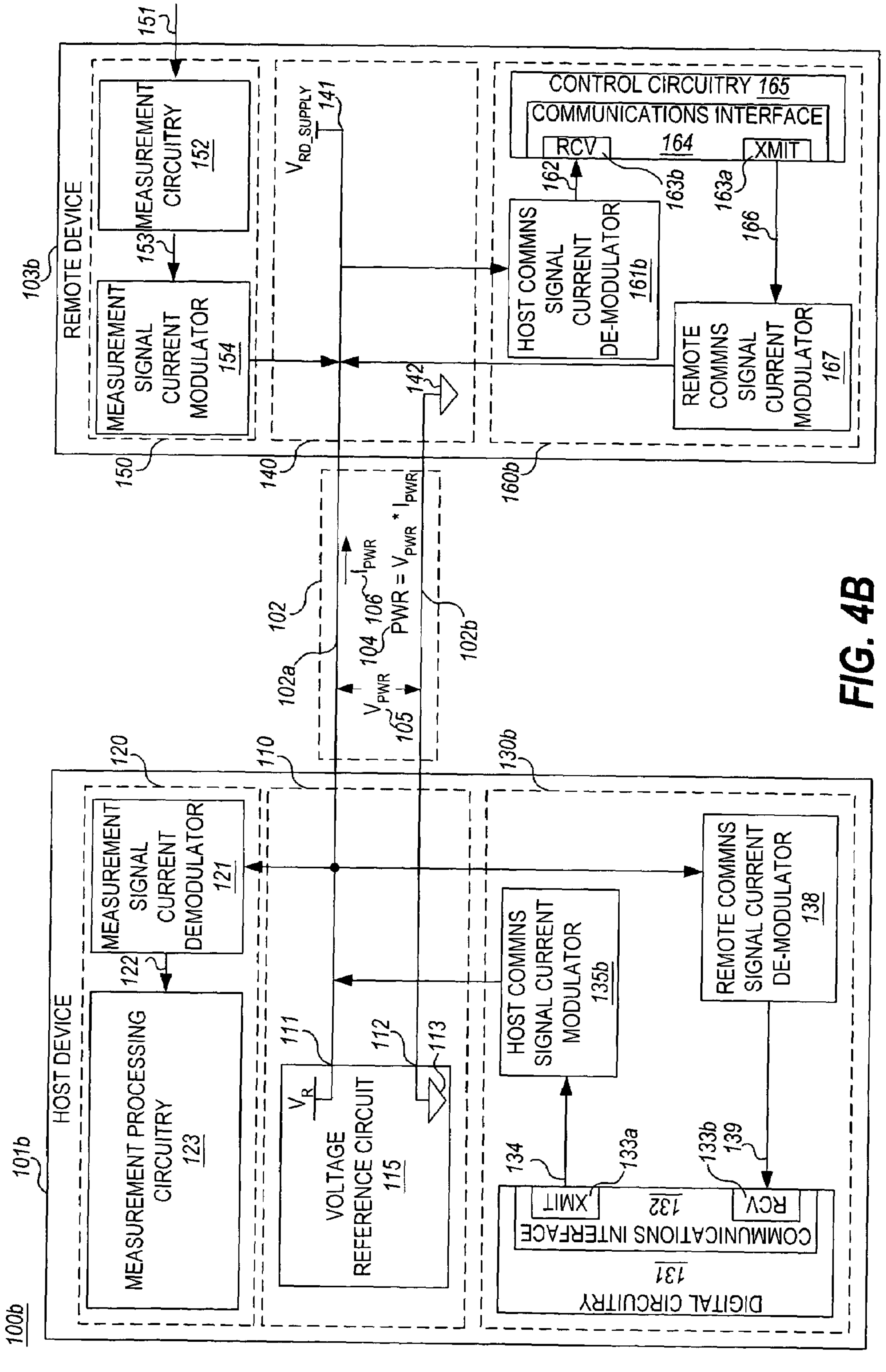
FIG. 4B is a schematic block diagram of a system illustrating a second exemplary application of the present invention.

FIG. 4B illustrates a second embodiment of an exemplary application of the present invention. In particular, FIG. 4B is a schematic diagram illustrating a system 100*b* that is identical to the system 100*a* of FIG. 4A with the exception of the circuitry associated with transmission of the host communications signal from the host device 101*b* to the remote sensor device 103*b*. To this end, the host communications signal voltage modulator 135_a_ in the host device communications block 130_a_ of the host device 101_a_ is replaced with a host communications signal current modulator 135_b_ in the host device communications block 130_b_ of the host device 101_b_. Similarly, the host communications signal voltage de-modulator 161_a_ in the remote sensor device communications block 160_a_ of the remote sensor device 103_a_ is replaced with a host communications signal current de-modulator 161_b_ in the remote sensor device communications block 160_b_ of the remote sensor device 103_b_. The remaining circuitry is identical to the embodiment shown in FIG. 4A and detail of its construction and operation may be found in the discussion above relating to FIG. 4A.

Figure 5B:
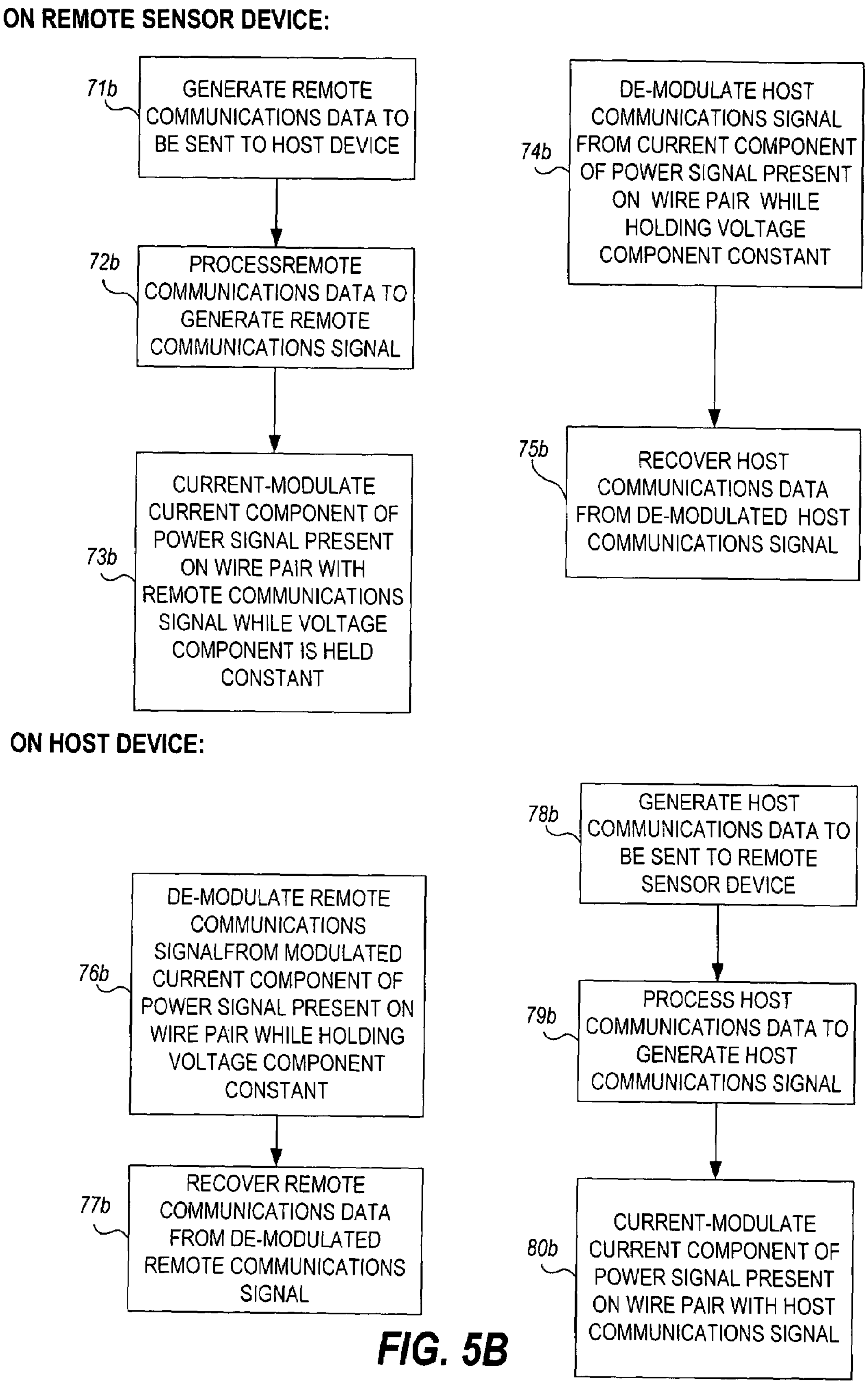
FIG. 5B is an operational flowchart illustrating the communication signal flow between the host and remote sensor devices of FIG. 4B.

FIG. 5B illustrates an exemplary method of operation of the system 100_b_ of FIG. 4B. In operation, the remote sensor device 103_b_ generates remote communications data to be sent to the host device 101_b_ in step 71_b_. In step 72_b_, the remote sensor device 103_b_ processes the remote communications data to generate a remote communications signal 166 representative of the remote communications data. In step 73_b_, the remote communications signal is used to modulate the current component $I_{PWR}$ 106 of the power signal PWR 104 present on the wire pair 102 while the voltage component $V_{PWR}$ 105 of the power signal PWR 104 is held substantially constant.

On the host side, the remote communications signal current de-modulator 138 demodulates the remote communications signal 139 from the current component $I_{PWR}$ 106 of the power signal PWR 104 in step 76_b_ while the voltage component $V_{PWR}$ 105 of the power signal PWR 104 is held substantially constant. In step 77_b_ the host device 101 recovers the remote communications data from the demodulated remote communications signal 139.

The host device 101 generates host communications data that needs to be sent to the sensor device 103 in step 78_b_. In step 79_b_, the host device 101 processes the host communications data to generate a host communications signal 134 representative of the host communications data. In step 80_b_, the host device 101 current modulates the current component $I_{PWR}$ 106 of the power signal PWR 104 present on the wire pair 102 with the host communications signal 134.

On the side of the remote sensor device 103, in step 74_b_ the host communications signal current de-modulator 161_b_ demodulates the host communications signal from the current component $I_{PWR}$ 106 of the power signal PWR 104 present on the wire pair 102. In step 75_b_, the remote sensor device 103 recovers the host communications data from the demodulated host communications signal 139.

4. Exemplary Embodiment

Figure 6:
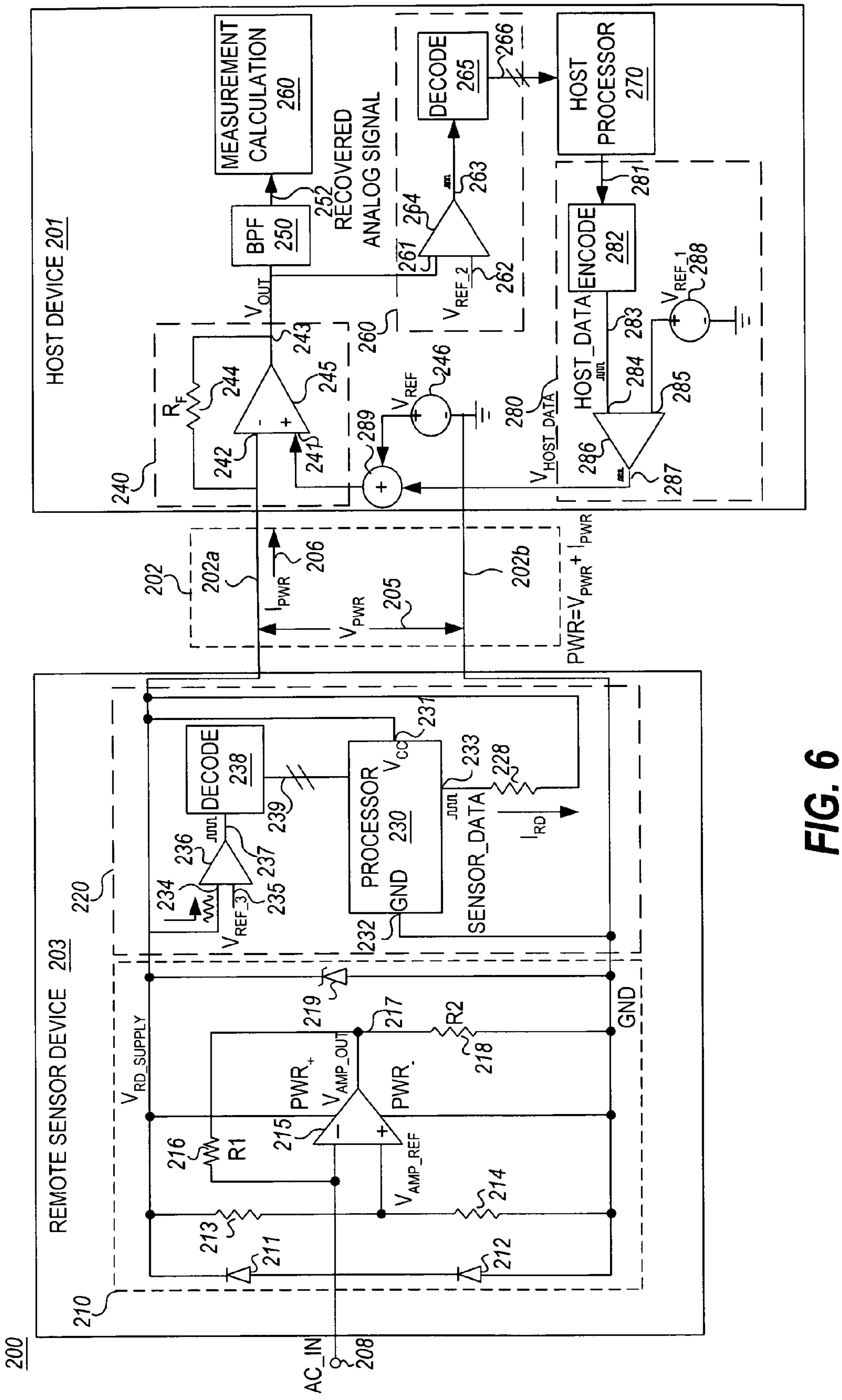
FIG. 6 is a schematic diagram of a preferred embodiment of a host/sensor system that applies the techniques of the invention.

A preferred embodiment of a host/sensor system 200 is considered in FIG. 6. System 200 includes a remote device 203 connected to a host device 201 by a single wire pair 202 (comprising first and second wires 202_a_ and 202_b_).

The host device 201 includes a voltage reference circuit 240 comprising a standard operational amplifier 245 with a feedback resistor $R_F$ 244 coupled between its output 243 its inverting input 242, and with a reference voltage $V_{REF}$ coupled to its non-inverting input 241. The voltage reference circuit 240 operates to generate the supply voltages $V_{RD\_SUPPLY}$ and GND for the remote device 203. During sensor-to-host communication, the voltage reference circuit 240 also operates to enforce a substantially constant supply voltage $V_{RD\_SUPPLY}$ across the remote device 203. In particular, in this embodiment, wire 202_a_ is connected to a positive supply voltage at the inverting input terminal 242 of operational amplifier 245 in the host device 201, and therefore operates as the positive supply voltage in the remote device 203. Likewise, wire 202_b_ is connected to a negative (or ground) supply voltage 248 in the host device 201, and therefore operates as the negative (or ground) supply voltage in the remote device 203.

In the illustrative embodiment, the host device 201 is also configured to send digital communication signals to the remote sensor device 203. To this end, host device 201 includes a host processor 270 which generates digital host data 281. An encoder 282 receives and encodes the digital host data 281 to generate a serial digital bit stream HOST_DATA 283. Encoder 282 may include circuitry for parallel-to-serial conversion, error detection/correction generation, packeting, framing, and otherwise preparing the digital host data for serial transmission. A comparator 286 receives the serial digital bit stream HOST_DATA 283 on a first input 284 and a reference voltage $V_{REF\_1}$ generated by a voltage source 288 on a second input 285. The reference voltage $V_{REF\_1}$ is set to approximately half the full voltage swing of the serial output pin of the encoder 282 (e.g., approximately 1.6 volts if the encoder output varies between 0 and 3.3 volts). The gain of the comparator 286 is preferably approximately $1/10^{th}$ of the supply voltage (e.g., 0.3). Thus, if the value of the incoming serial digital bit of HOST_DATA 283 is a logical low, or 0 volts, the voltage $V_{HOST\_DATA}$ on the output 287 of the comparator 286 will be logically low (or $V_{HOST\_DATA}$=approximately 0 volts) since it will be less than the reference voltage $V_{REF\_1}$. If the value of the incoming serial digital bit of HOST_DATA 283 is a logical high, or 3.3 volts, the voltage $V_{HOST\_DATA}$ on the output 287 of the comparator 286 will be logically high (or $V_{HOST\_DATA}$=approximately 0.3 volts, i.e., 3.3 volts times a 0.1 gain) since the voltage seen on the first input 284 of the comparator 286 will be greater than the reference voltage $V_{REF\_1}$ seen on the second input 285. The output 287 of the comparator 286 is connected to one input of a summing device 289. A voltage source 246 which constantly sources the reference voltage $V_{REF}$ is connected to other input of the summing device 289. When the host device 201 is configured in a send mode in which it sends digital host data to the remote device 203, the digital host data at the output 287 of comparator 286 is summed (and therefore modulated) with the voltage component $V_{PWR}$ 205 of the power signal PWR 204 present on the wire pair 202. The output of the summing device 289 is therefore $V_{REF}+V_{HOST\_DATA}$, which in the illustrative embodiment will always range between 3.3 volts and 3.6 volts. Thus, the supply voltage $V_{RD\_SUPPLY}$ at the remote device 203 is sufficient to power the remote device 203 and varies above the minimum acceptable voltage threshold for a logical high signal. Accordingly, the modulation of the voltage supply does not adversely affect the digital circuitry 220 of the remote device 203.

In the illustrative embodiment, the remote device 203 includes both analog circuitry 210 and digital circuitry 230. The analog circuitry 210 implements an active amplifier circuit which amplifies the AC signal AC_IN 208 to increase the signal to noise ratio (SNR) and to decrease the effects of stray capacitance. In the example shown AC_IN is assumed to be a current signal; however it is to be understood that a voltage source and series impedance would yield the same operation. It is this amplified current signal present on node 217 at the output of the amplifier 215 that is to be sent to the host device 201.

There can be many alternative circuits to accomplish this amplifying effect as would be readily apparent by an artisan in the field. In the illustrative embodiment the amplifier 215 is a standard operational amplifier, such as a TL072 by Texas Instruments of Dallas, Tex. Diodes 211 and 212 are standard silicon small signal diodes and diode 219 is a 7.5 V zener diode. Resistors 213 and 214 are 100 K ohm resistors and resistors 216 and 218 are 1 M ohm and 464 ohm resistors, respectively. Most of these component values may be varied to optimize signal-to-noise and dynamic range for a particular measurement application.

In operation, amplifier 215 drives load R2 218. Amplifier 215 has a first power input $PWR_+$ connected to the positive supply voltage $V_{RD\_SUPPLY}$ of the remote device 203, or wire 202*a*. Amplifier 215 has a second power input PWR_ connected to the negative supply voltage (GND) of the remote device 203, or wire 202*b*. AC signal AC_IN 208 is received on an inverting input of the amplifier 215 and a bias reference signal $V_{AMP\_REF}$ formed at the junction of resistors 213 and 214 is received on a non-inverting input of the amplifier 215. The voltage $V_{AMP\_OUT}$ on node 217 at the output of the amp 215 reflects the difference between the AC input signal AC_IN 208 and the amplifier reference signal $V_{AMP\_REF}$. Thus, the amplifier output voltage $V_{AMP\_OUT}$ changes as the AC input signal AC_IN 208 changes. Amplifier 215 drives the voltage $V_{AMP\_OUT}$ across a resistor R2 218 that is inversely proportional to the AC input signal AC_IN 208. (An inverse relationship exists due to the inverting amplifier topology). When the value of the input signal AC_IN 208 is DC or not present, no additional current needs to be pulled through the power feed loop. However, when the value of the input signal AC_IN 208 causes the output $V_{AMP\_OUT}$ of the amplifier 215 to vary around the quiescent reference level $V_{AMP\_REF}$ (typically one half amplifier supply voltage), the power feed wires 202*a* and 202*b* must pull additional current through the power loop. The additional loop current is directly proportional to the amplified signal current flowing through load resistor 218. Accordingly, the current through the power loop wires 202*a* and 202*b* changes based on the AC input signal AC_IN 208. Importantly, because the host device 201 enforces a substantially constant supply voltage ($V_{RD\_SUPPLY}=V_{PWR}$) across the remote device 203 (i.e., between wires 202*a* and 202*b*) during sensor-to-host communication, a changing AC input signal AC_IN 208 operates to modulate the current component $I_{PWR}$ 206 of the power signal PWR 204 present on the wire pair 202 without affecting the supply voltage $V_{RD\_SUPPLY}$ of the remote device 203. This ensures that both digital and analog circuitry that are powered on the host by $V_{RD\_SUPPLY}$ are not adversely affected.

Referring now to the voltage reference circuit 240 on the host device 201, the voltage $V_{OUT}$ at the output 243 of the operational amplifier 245 changes in response to current changes on the wire 202*a* (due to modulation of the current component $I_{PWR}$ of the power signal PWR present on the wire pair 202 by the remote device 203) as the operational amplifier 245 seeks to maintain the virtual null between its inverting and non-inverting input terminals 241 and 242. Accordingly, because the changes in $V_{OUT}$ reflect the remote sensor data modulated with the current component $I_{PWR}$ 206 of the power signal PWR 205, the remote sensor data can be recovered by sending $V_{OUT}$ through a bandpass filter (BPF) 250 (or other suitable filter that passes only frequency the range of interest). The operational amplifier 245 and BPF 250 operate together to effectively demodulate (or recover) the remote analog sensor data from the power signal present on the wire pair 202. The recovered analog sensor data signal 252 may then be processed by measurement calculation circuitry 260.

Digital communication between the host device 201 and the remote device 203 is also achievable. To this end, the remote device 203 includes digital circuitry 220 implementing at least a communications interface. In the illustrative embodiment, the communication interface 220 is a serial interface that generally includes all of the functionality for preparing, conditioning, transmitting, receiving, and recovering digital signals as is well known in the art, including amplification circuitry, sample-and-hold circuitry, frame detection circuitry, and serial-to-parallel and/or parallel-to-serial conversion. Communication interface 220 may also include error detection/correction circuitry and instruction packet extraction circuitry depending on the communications protocol. These functions may be called out specifically in FIG. 6; however, if not explicitly shown in FIG. 6, it is to be understood that such functions are included where necessary for proper communication between the host and remote devices (or vice versa).

Turning now to the specific implementation of the digital circuitry 220 of the remote sensor device 203, the digital circuitry 220 includes host data recovery circuitry, including a comparator 236 and decoder 238. Comparator 236 compares the voltage present at its first input 234 (which is coupled to wire 202*a*) to a reference voltage $V_{REF\_3}$ present at its second input 235. The reference voltage $V_{REF\_3}$ is set to approximately $(V_R+V_{HOST\_DATA})/2$ (e.g., approximately (3.3V+0.3V)/2, or 1.8 volts). The comparator 236 is preferably characterized by a unit gain. Thus, if the value of the modulated supply voltage $V_{RD\_SUPPLY}$ is below $V_{REF\_3}$, the voltage $V_{HOST\_DATA}$ on the output 287 of the comparator 286 will be logically low (or approximately 0 volts). If the value of the incoming serial digital bit of HOST_DATA 283 is a logical high, or above $V_{REF\_3}$, the voltage on the output 287 of the comparator 286 will be logically high (or approximately 3.3 volts). A decoder processes the digital bit stream on the output 287 of the comparator 206 and formats recovered host data 239 suitable for processing by the sensor processor 230. Accordingly, host data (which may include encoded commands) is channeled from the host device 201 to the remote sensor device 203.

Remote sensor device 203 is also configured to send digital data to the host device 201. In this regard, processor 230 generates digital control/data signals (hereinafter "digital sensor data") to send to the host device 201. The processor 240 may be implemented by any one or more of the following: microprocessor, microcontroller, ASIC, FPGA, digital state machine, and/or other digital circuitry. In the illustrative embodiment, the processor 230 internally converts the digital sensor data from a parallel format to a serial bit stream, which is output onto the processor's serial output pin 233. A resistor 228 is coupled between serial output pin 233 and the positive power feed wire 202*a*. In general, resistor 228 can be tied to either the positive or negative power feed node assuming the output pin 233 can sink and source sufficient current. The implementation shown is compatible with an open collector output which is limited to current sinking. Therefore, connecting resistor to the positive power feed will enable output 233 to increase the supply current when driving a logic low. Processor 230 has a power ($V_{CC}$) input pin 231 connected to the remote device positive supply voltage $V_{RD\_SUPPLY}$ on wire 202*a* and a ground (GND) input pin 232 connected the remote device negative (or ground) supply voltage on wire 202*b*.

In operation, processor 230 outputs the serial digital sensor data in the form of a bit stream SENSOR_DATA onto pin 233, which drives current $I_{RD}$ across resistor 228. When the value of the digital bit being output onto pin 233 is a logical 1, the output voltage on pin 233 is approximately equal to the positive power feed voltage and therefore no additional current needs to be pulled through the power loop. However, when the value of the digital bit being output onto pin 233 is a logical 0, the output voltage on pin 233 must be pulled toward ground potential which causes additional current to flow through resistor 288 and, therefore, in the power supply loop. Since the remote device supply voltages $V_{RD\_SUPPLY}$ and GND are enforced at a constant level by the voltage reference circuit 240 of the host device 201 during sensor-to-host communication, the processor 230 must pull additional current through the power loop (formed by wires 202*a* and 202*b* connecting to the host device 201) in order to accommodate the load current through resistor 288 as logic levels switch. Accordingly, the amount of current $I_{RD}$ flowing through the resistor 228 changes depending on whether the processor 230 is driving a logical 0 or a logical 1. Because the voltage component $V_{PWR}$ 205 of the power signal PWR 204 present on the wire pair 202 is constant, as enforced by the host device 201, the digital sensor data bit stream SENSOR_DATA is effectively modulated with the current component of the power signal present on the wire pair 202.

The host device 201 includes digital sensor data recovery circuitry. In this regard, the host device 201 includes a comparator 264 and decoder 265. Comparator 264 compares the voltage $V_{OUT}$ present at its first input 261 (which is coupled to the output 243 of operational amplifier 245) to a reference voltage $V_{REF\_2}$ present at its second input 262. The reference voltage $V_{REF\_2}$ is set to approximately $(V_R+V_{HOST\_DATA})/2$ (e.g., approximately (3.3V+0.3V)/2, or 1.8 volts). The comparator 264 is preferably characterized by a unit gain. Thus, if the value of the output voltage $V_{OUT}$ of the comparator 245 is below $V_{REF\_2}$, the voltage on the output 263 of the comparator 264 will be logically low (or approximately 0 volts). If the value of the output voltage $V_{OUT}$ of the comparator 245 is above $V_{REF\_3}$, the voltage on the output 263 of the comparator 264 will be logically high (or approximately 3.3 volts). A decoder 265 processes the digital bit stream on the output 263 of the comparator 264 and formats recovered sensor data 266 suitable for processing by the sensor processor 230. Accordingly, digital sensor data is channeled from the remote sensor device 203 to the host device 201.

Figure 7:
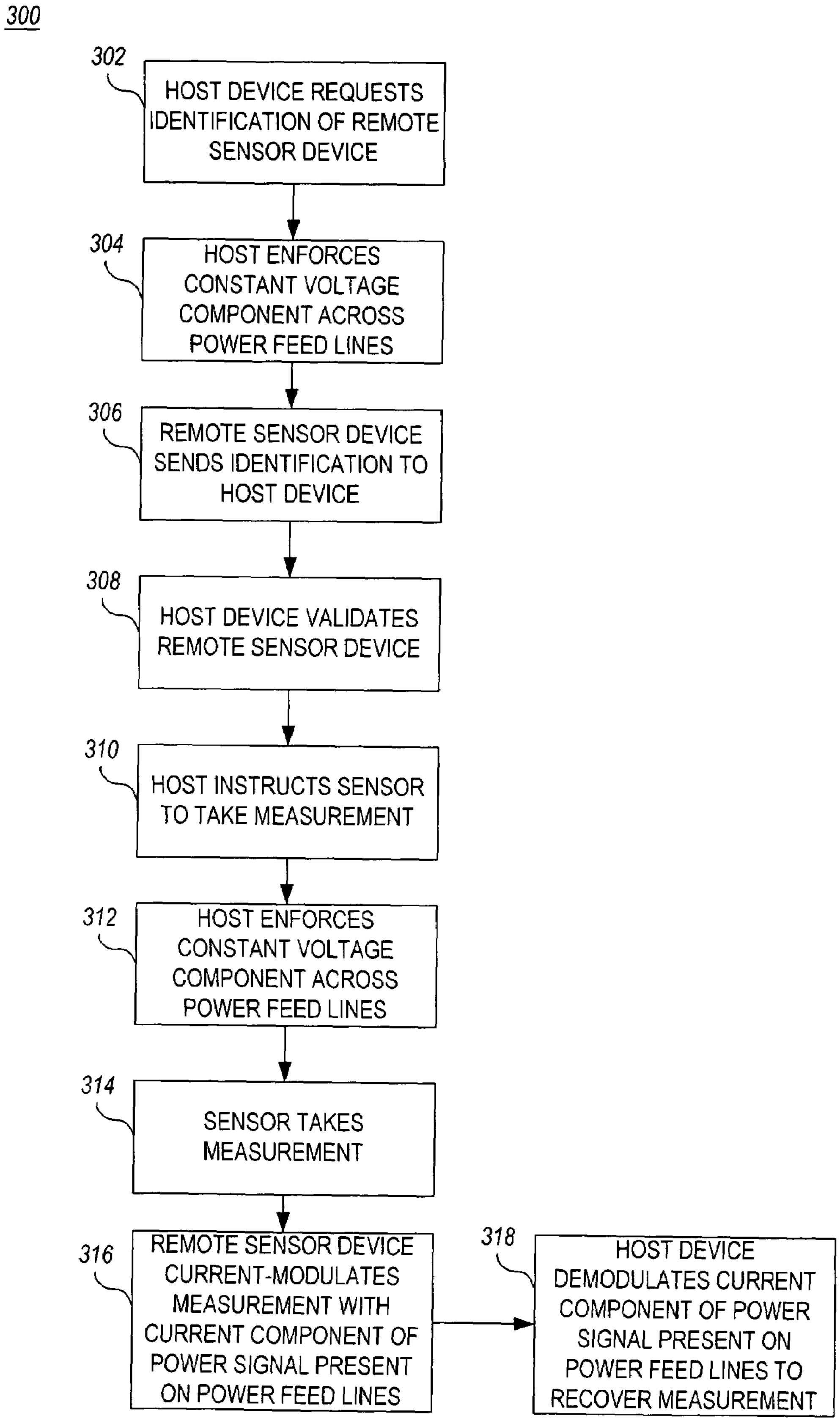
FIG. 7 is an operational flowchart illustrating the transfer of signals between the host device and remote sensor device of FIG. 6.

FIG. 7 is an operational flowchart 300 illustrating the transfer of signals between the host device 201 and remote sensor device 203 of FIG. 6. As illustrated, host device 201 requests remote sensor device 203 to identify itself in step 302. To accomplish this, the host device 201 generates digital host data HOST_DATA 283 containing an appropriate instruction for the sensor device processor 230, and voltage-modulates the power signal over lines 202*a* and 202*b* with the digital host data HOST_DATA 283.

In step 304, host device 201 enforces a substantially constant voltage source at the remote device 203.

Remote sensor device 203 responds to the host device 201 with its identification in step 306. To accomplish this, the processor 230 retrieves its identification information and/or calibration data from a memory (not shown) and converts it to a serial digital bit stream SENSOR_DATA on serial output pin 233, where it is current-modulated with the power signal.

Host device 201 verifies the identification information in step 308.

Assuming the identification is valid, host device 201 instructs remote sensor device 203 to take a measurement in step 310 by generating digital host data HOST_DATA 283 containing an appropriate instruction for the sensor device processor 230, and voltage-modulating it with the power signal over lines 202*a* and 202*b*.

Host device 201 then enforces a substantially constant voltage source at the remote device 203 by disabling its transmit circuitry in step 312. Remote sensor device 203 then takes an analog measurement in step 314 and modulates the loop current in step 316. The current-modulated measurement is demodulated from the power signal present on the wire pair 202 in step 318 by host device 201.

Although this preferred embodiment of the present invention has been disclosed for illustrative purposes, those skilled in the art will appreciate that various modifications, additions and substitutions are possible, without departing from the scope and spirit of the invention as disclosed in the accompanying claims. It is also possible that other benefits or uses of the currently disclosed invention will become apparent over time.

What is claimed is:

1. A host device couplable to a remote device via a single wire pair, said single wire pair comprising a first wire and a second wire, said remote device comprising first remote signal generation circuitry operable to generate a first remote signal and a first remote current modulator operable to modulate a current component of a power signal present on said single wire pair with said first remote signal when said first remote signal is communicated to said host device, said host device comprising:

a voltage reference and control loop circuit which generates and enforces a substantially constant voltage component of said power signal present on said single wire pair during communication between said first remote signal to said host device and said host device to said first remote device; and a first host current de-modulator operable to de-modulate said first remote signal from said current component of said power signal present on said single wire pair during communication of said first remote signal to said host device.

2. A host device in accordance with claim 1, wherein:

said voltage reference and control loop circuit comprises:

a voltage generator which generates a substantially constant reference voltage during communication of said first remote signal to said host device;

an operational amplifier having a first input terminal coupled to receive said reference voltage, a second input terminal coupled to said first wire, a feedback resistor coupled between said output terminal and said second input terminal, and an output terminal which outputs an operational amplifier output voltage signal that reflects a current that is passing through said feedback resistor, wherein said operational amplifier operates to mirror said reference voltage received at said first input terminal on said second input terminal; and said first host current de-modulator comprises:

a filter which filters said operational amplifier output voltage signal to recover said first remote signal.

3. A host device in accordance with claim 2, comprising:

host signal generation circuitry operable to generate a host signal;

a host current modulator operable to modulate said current component of said power signal present on said single wire pair with said host signal while said voltage reference and control loop circuit enforces a substantially constant voltage component of said power signal present on said single wire pair during communication of said host signal to said remote device;

wherein said remote device comprises:

a remote current de-modulator operable to de-modulate said host signal from said current component of said power signal present on said single wire pair during communication of said host signal to said remote device.

4. A host device in accordance with claim 3, wherein:

said remote device comprises second remote signal generation circuitry operable to generate a second remote signal and a second remote current modulator operable to modulate said current component of said power signal present on said single wire pair with said second remote signal during communication of said second remote signal to said host device; and said host device comprises:

a second host current de-modulator operable to de-modulate said second remote signal from said current component of said power signal present on said single wire pair during communication of said second remote signal to said host device;

wherein said voltage reference and control loop circuit enforces a substantially constant voltage component of said power signal present on said single wire pair during communication of said second remote signal to said host device.

5. A host device in accordance with claim 4, wherein:

said voltage reference and control loop circuit comprises:

a voltage generator which generates a substantially constant reference voltage during communication of said first remote signal to said host device;

an operational amplifier having a first input terminal coupled to receive said reference voltage, a second input terminal coupled to said first wire, a feedback resistor coupled between said output terminal and said second input terminal, and an output terminal which outputs an operational amplifier output voltage signal that reflects a current that is passing through said feedback resistor, wherein said operational amplifier operates to mirror said reference voltage received at said first input terminal on said second input terminal;

said first host current modulator comprises:

a filter which filters said operational amplifier output voltage signal to recover said first remote signal; and said second host current de-modulator comprises:

a filter which filters said operational amplifier output voltage signal to recover said second remote signal.

6. A host device in accordance with claim 1, comprising:

host signal generation circuitry operable to generate a host signal;

a host current modulator operable to modulate said current component of said power signal present on said single wire pair with said host signal while said voltage reference and control loop circuit enforces a substantially constant voltage component of said power signal present on said single wire pair during communication of said host signal to said remote device;

wherein said remote device comprises:

a remote current de-modulator operable to de-modulate said host signal from said current component of said power signal present on said single wire pair during communication of said host signal to said remote device.

7. A host device in accordance with claim 1, wherein:

said remote device comprises second remote signal generation circuitry operable to generate a second remote signal and a second remote current modulator operable to modulate said current component of said power signal present on said single wire pair with said second remote signal during communication of said second remote signal to said host device; and said host device comprises:

a second host current de-modulator operable to de-modulate said second remote signal from said current component of said power signal present on said single wire pair during communication of said second remote signal to said host device;

wherein said voltage reference and control loop circuit enforces a substantially constant voltage component of said power signal present on said single wire pair during communication of said second remote signal to said host device.

8. A host device in accordance with claim 7, wherein:

said voltage reference and control loop circuit comprises:

a voltage generator which generates a substantially constant reference voltage during communication of said first remote signal to said host device;

an operational amplifier having a first input terminal coupled to receive said reference voltage, a second input terminal coupled to said first wire, a feedback resistor coupled between said output terminal and said second input terminal, and an output terminal which outputs an operational amplifier output voltage signal that reflects a current that is passing through said feedback resistor, wherein said operational amplifier operates to mirror said reference voltage received at said first input terminal on said second input terminal;

said first host current modulator comprises:

a filter which filters said operational amplifier output voltage signal to recover said first remote signal; and said second host current de-modulator comprises:

a filter which filters said operational amplifier output voltage signal to recover said second remote signal.

9. A host device in accordance with claim 1, comprising:

host signal generation circuitry operable to generate a host signal;

a host voltage modulator operable to modulate said voltage component of said power signal present on said single wire pair with said host signal during communication of said host signal to said remote device;

wherein said remote device comprises:

a remote voltage de-modulator operable to de-modulate said host signal from said voltage component of said power signal present on said single wire pair during communication of said host signal to said remote device.

10. A host device in accordance with claim 9, wherein:

said voltage reference and control loop circuit comprises:

a voltage generator which generates a substantially constant reference voltage during communication of said first remote signal to said host device;

an operational amplifier having a first input terminal coupled to receive said reference voltage, a second input terminal coupled to said first wire, a feedback resistor coupled between said output terminal and said second input terminal, and an output terminal which outputs an operational amplifier output voltage signal that reflects a current that is passing through said feedback resistor, wherein said operational amplifier operates to mirror said reference voltage received at said first input terminal on said second input terminal; and said first host current de-modulator comprises:

a filter which filters said operational amplifier output voltage signal to recover said first remote signal.

11. A host device in accordance with claim 9, wherein:

said remote device comprises second remote signal generation circuitry operable to generate a second remote signal and a second remote current modulator operable to modulate said current component of said power signal present on said single wire pair with said second remote signal during communication of said second remote signal to said host device; and said host device comprises:

a second host current de-modulator operable to de-modulate said second remote signal from said current component of said power signal present on said single wire pair during communication of said second remote signal to said host device;

wherein said voltage reference and control loop circuit enforces a substantially constant voltage component of said power signal present on said single wire pair during communication of said second remote signal to said host device.

12. A host device in accordance with claim 11, wherein:

said voltage reference and control loop circuit comprises:

a voltage generator which generates a substantially constant reference voltage during communication of said first remote signal to said host device;

an operational amplifier having a first input terminal coupled to receive said reference voltage, a second input terminal coupled to said first wire, a feedback resistor coupled between said output terminal and said second input terminal, and an output terminal which outputs an operational amplifier output voltage signal that reflects a current that is passing through said feedback resistor, wherein said operational amplifier operates to mirror said reference voltage received at said first input terminal on said second input terminal;

said first host current de-modulator comprises:

a filter which filters said operational amplifier output voltage signal to recover said first remote signal; and said second host current de-modulator comprises:

a filter which filters said operational amplifier output voltage signal to recover said second remote signal.

13. A host device couplable to a remote device via a single wire pair, said single wire pair comprising a first wire and a second wire, said remote device comprising first remote signal generation circuitry operable to generate a first remote signal and a first remote current de-modulator operable to de-modulate a host signal from a current component of a power signal present on said single wire pair when said host signal is communicated to said remote device, said host device comprising:

a voltage reference and control loop circuit which enforces a substantially constant voltage component of said power signal present on said single wire pair during communication between of said first remote signal to said host device and said host device to said first remote device; and host signal generation circuitry operable to generate said host signal;

a host current modulator operable to modulate said current component of said power signal present on said single wire pair with said host signal while said voltage reference and control loop circuit enforces a substantially constant voltage component of said power signal present on said single wire pair during communication of said host signal to said remote device.

14. A host device in accordance with claim 13, wherein:

said voltage reference and control loop circuit comprises:

a voltage generator which generates a substantially constant reference voltage during communication of said first remote signal to said host device;

an operational amplifier having a first input terminal coupled to receive said reference voltage, a second input terminal coupled to said first wire, a feedback resistor coupled between said output terminal and said second input terminal, and an output terminal which outputs an operational amplifier output voltage signal that reflects a current that is passing through said feedback resistor, wherein said operational amplifier operates to mirror said reference voltage received at said first input terminal on said second input terminal.

15. A host device in accordance with claim 14, comprising:

a first host current de-modulator operable to de-modulate a first remote signal from said current component of said power signal present on said single wire pair during communication of said first remote signal to said host device;

wherein said remote device comprises:

first remote signal generation circuitry operable to generate said first remote signal;

a first remote current modulator operable to modulate said current component of said power signal present on said single wire pair with said first remote signal while said voltage reference and control loop circuit enforces a substantially constant voltage component of said power signal present on said single wire pair during communication of said first remote signal to said host device.

16. A host device in accordance with claim 13, comprising:

a first host current de-modulator operable to de-modulate a first remote signal from said current component of said power signal present on said single wire pair during communication of said first remote signal to said host device;

wherein said remote device comprises:

first remote signal generation circuitry operable to generate said first remote signal;

a first remote current modulator operable to modulate said current component of said power signal present on said single wire pair with said first remote signal while said voltage reference and control loop circuit enforces a substantially constant voltage component of said power signal present on said single wire pair during communication of said first remote signal to said host device.

17. A host device in accordance with claim 16, wherein:

said first host current de-modulator comprises:

a filter which filters said operational amplifier output voltage signal to recover said first remote signal.

18. A host device in accordance with claim 16, wherein:

said remote device comprises second remote signal generation circuitry operable to generate a second remote signal and a second remote current modulator operable to modulate said current component of said power signal present on said single wire pair with said second remote signal during communication of said second remote signal to said host device; and said host device comprises:

a second host current de-modulator operable to de-modulate said second remote signal from said current component of said power signal present on said single wire pair during communication of said second remote signal to said host device;

wherein said voltage reference and control loop circuit enforces a substantially constant voltage component of said power signal present on said single wire pair during communication of said second remote signal to said host device.

19. A host device in accordance with claim 18, wherein:

said voltage reference and control loop circuit comprises:

a voltage generator which generates a substantially constant reference voltage during communication of said first remote signal to said host device;

an operational amplifier having a first input terminal coupled to receive said reference voltage, a second input terminal coupled to said first wire, a feedback resistor coupled between said output terminal and said second input terminal, and an output terminal which outputs an operational amplifier output voltage signal that reflects a current that is passing through said feedback resistor, wherein said operational amplifier operates to mirror said reference voltage received at said first input terminal on said second input terminal;

said first host current de-modulator comprises:

a filter which filters said operational amplifier output voltage signal to recover said first remote signal; and said second host current de-modulator comprises:

a filter which filters said operational amplifier output voltage signal to recover said second remote signal.

20. A host device in accordance with claim 13, wherein:

said remote device comprises second remote signal generation circuitry operable to generate a second remote signal and a second remote current modulator operable to modulate with said second remote signal said current component of said power signal present on said single wire pair during communication of said second remote signal to said host device; and said host device comprises:

a second host current de-modulator operable to de-modulate said second remote signal from said current component of said power signal present on said single wire pair during communication of said second remote signal to said host device;

wherein said voltage reference and control loop circuit enforces a substantially constant voltage component of said power signal present on said single wire pair during communication of said second remote signal to said host device.

21. A host device in accordance with claim 20, wherein:

said voltage reference and control loop circuit comprises:

a voltage generator which generates a substantially constant reference voltage during communication of said first remote signal to said host device;

an operational amplifier having a first input terminal coupled to receive said reference voltage, a second input terminal coupled to said first wire, a feedback resistor coupled between said output terminal and said second input terminal, and an output terminal which outputs an operational amplifier output voltage signal that reflects a current that is passing through said feedback resistor, wherein said operational amplifier operates to mirror said reference voltage received at said first input terminal on said second input terminal;

said first host current de-modulator comprises:

a filter which filters said operational amplifier output voltage signal to recover said first remote signal; and said second host current de-modulator comprises:

a filter which filters said operational amplifier output voltage signal to recover said second remote signal.

22. A method for channeling signals between a host device and a remote device, said host device and said remote device connected by a single wire pair comprising a first wire and a second wire, and said host device supplying a power signal comprising a current component and a voltage component to said remote device over said single wire pair, said method comprising:

at said host device, holding said voltage component of said power signal present on said wire pair substantially constant during communication between to said host device and said remote device;

at said remote device, generating a remote signal;

at said remote device, current-modulating said remote signal with said current component of said power signal present on said wire pair; and at said host device, de-modulating said current component of said power signal present on the wire pair to recover said remote signal.

23. A method in accordance with claim 22, said method further comprising the steps of:

at said host device, generating a host signal;

at said host device, current-modulating said host signal with said current component of said power signal present on said wire pair; and at said remote device, de-modulating said current component of said power signal present on said wire pair to recover said host signal.

24. A method in accordance with claim 23, said method further comprising the steps of:

at said remote device, generating a second remote signal;

at said remote device, current-modulating said second remote signal with said current component of said power signal present on said wire pair; and at said host device, de-modulating said current component of said power signal present on the wire pair to recover said second remote signal.

25. A method in accordance with claim 22, said method further comprising the steps of:

at said host device, generating a host signal;

at said host device, voltage-modulating said host signal with said voltage component of said power signal present on said wire pair; and at said remote device, de-modulating said voltage component of said power signal present on said wire pair to recover said host signal.

26. A method in accordance with claim 25, said method further comprising the steps of:

at said remote device, generating a second remote signal;

at said remote device, current-modulating said second remote signal with said current component of said power signal present on said wire pair; and at said host device, de-modulating said current component of said power signal present on the wire pair to recover said second remote signal.

27. A method in accordance with claim 22, said method further comprising the steps of:

at said remote device, generating a second remote signal;

at said remote device, current-modulating said second remote signal with said current component of said power signal present on said wire pair; and at said host device, de-modulating said current component of said power signal present on the wire pair to recover said second remote signal.

28. A method for channeling signals between a host device and a remote device, said host device and said remote device connected by a single wire pair comprising a first wire and a second wire, and said host device supplying a power signal comprising a current component and a voltage component to said remote device over said single wire pair, said method comprising:

at said host device:

holding said voltage component of said power signal present on said wire pair substantially constant during communication between said host device and said remote device;

generating a host signal; and current-modulating said host signal with said current component of said power signal present on said wire pair; and at said remote device:

de-modulating said current component of said power signal present on the wire pair to recover said host signal.

29. A method in accordance with claim 28, said method further comprising the steps of:

at said remote device:

generating a first remote signal;

current-modulating said first remote signal with said current component of said power signal present on said wire pair; and at said host device:

de-modulating said current component of said power signal present on the wire pair to recover said first remote signal.

30. A method in accordance with claim 29, said method further comprising the steps of:

at said remote device:

generating a second remote signal;

current-modulating said second remote signal with said current component of said power signal present on said wire pair; and at said host device:

de-modulating said current component of said power signal present on the wire pair to recover said second remote signal.

31. A voltage reference and power loop control circuit for supplying power and channeling signals from a remote device over a single wire pair, said single wire pair comprising a first wire and a second wire, said remote device operable to modulate a current component of a power signal present on said single wire pair with a remote signal, said circuit comprising:

a voltage generator which generates a reference voltage that enforces a substantially constant voltage present on said single wire pair during communication between said host device and said remote device;

an operational amplifier having a first input terminal coupled to receive said reference voltage, a second input terminal coupled to said first wire, a feedback resistor coupled between said output terminal and said second input terminal, and an output terminal which outputs an operational amplifier output voltage signal that reflects a current that is passing through said feedback resistor, wherein said operational amplifier operates to mirror said reference voltage received at said first input terminal on said second input terminal; and a filter which filters said operational amplifier output voltage signal to recover said remote signal.

* * * * *

UNITED STATES PATENT AND TRADEMARK OFFICE

CERTIFICATE OF CORRECTION

PATENT NO. : 7,170,394 B2
APPLICATION NO. : 10/632463
DATED : January 30, 2007
INVENTOR(S) : Chandler et al.

It is certified that error appears in the above-identified patent and that said Letters Patent is hereby corrected as shown below:

In column 20, line 16, in Claim 22, after “between” delete “to”.

Signed and Sealed this

First Day of May, 2007

JON W. DUDAS
*Director of the United States Patent and Trademark Office*